United States Patent [19]

Peeters et al.

[11] Patent Number: 4,745,505
[45] Date of Patent: May 17, 1988

[54] MAGNETIC HEAD WITH A MODIFIED GAP FILLER

[75] Inventors: Winfried L. Peeters; Johannes J. Ponjee, both of Eindhoven, Netherlands

[73] Assignee: U.S. Philips Corporation, New York, N.Y.

[21] Appl. No.: 625,420

[22] Filed: Jun. 28, 1984

[30] Foreign Application Priority Data

Jul. 4, 1983 [NL] Netherlands ............... 8302364

[51] Int. Cl.⁴ .............................................. G11B 5/235
[52] U.S. Cl. ...................................... 360/120; 360/119
[58] Field of Search ............... 360/120, 110, 119, 125, 360/121; 428/900; 29/603

[56] References Cited

U.S. PATENT DOCUMENTS

| | | | |
|---|---|---|---|
| 3,544,982 | 12/1970 | Hanak | 360/120 |
| 4,172,318 | 10/1979 | Huntt | 360/120 |
| 4,368,496 | 1/1983 | Kato et al. | 360/120 |

FOREIGN PATENT DOCUMENTS

| | | |
|---|---|---|
| 0416635 | 1/1970 | Australia . |
| 1184979 | 1/1965 | Fed. Rep. of Germany . |
| 1506202 | 11/1069 | France . |
| 0009108 | 1/1978 | Japan ............... 360/120 |
| 0022404 | 1/1978 | Japan . |
| 0169919 | 10/1982 | Japan . |
| 0917824 | 2/1963 | United Kingdom . |

OTHER PUBLICATIONS

U.S. Army, "Improved Metal Bonding with Silates", Manufacturing Technology Notes, Jul. 1980, Report M. ARLCD-TR-78042.

Leveque, "Bonding with Adhesive Transfer", IBM TDB, Aug. 1966, vol. 9, No. 3, p. 249.

*Primary Examiner*—Stuart N. Hecker
*Assistant Examiner*—David J. Severin
*Attorney, Agent, or Firm*—F. Brice Faller

[57] ABSTRACT

The magnetic head according to the invention has a magnetic core (1, 2) with pole tips (3, 4) which limit a gap (5) which is filled with a synthetic resin chosen from the group comprising epoxy resins, acrylic ester resins and polyester resins as a non-magnetizable material which adheres the pole tips to each other. The gap has a length of at most 0.5 μm. A modifier may be used at the interfaces between the synthetic resin and the pole tips (3, 4) to further increase the tensile strength. The magnetic head is manufactured by applying to a moulding (1) of magnetizable material a solution of synthetic resin, by rotating the moulding about an axis at right angles to the coated surface and by placing a second moulding of magnetizable material (2) against it and curing the synthetic resin under pressure at an elevated temperature.

3 Claims, 2 Drawing Sheets

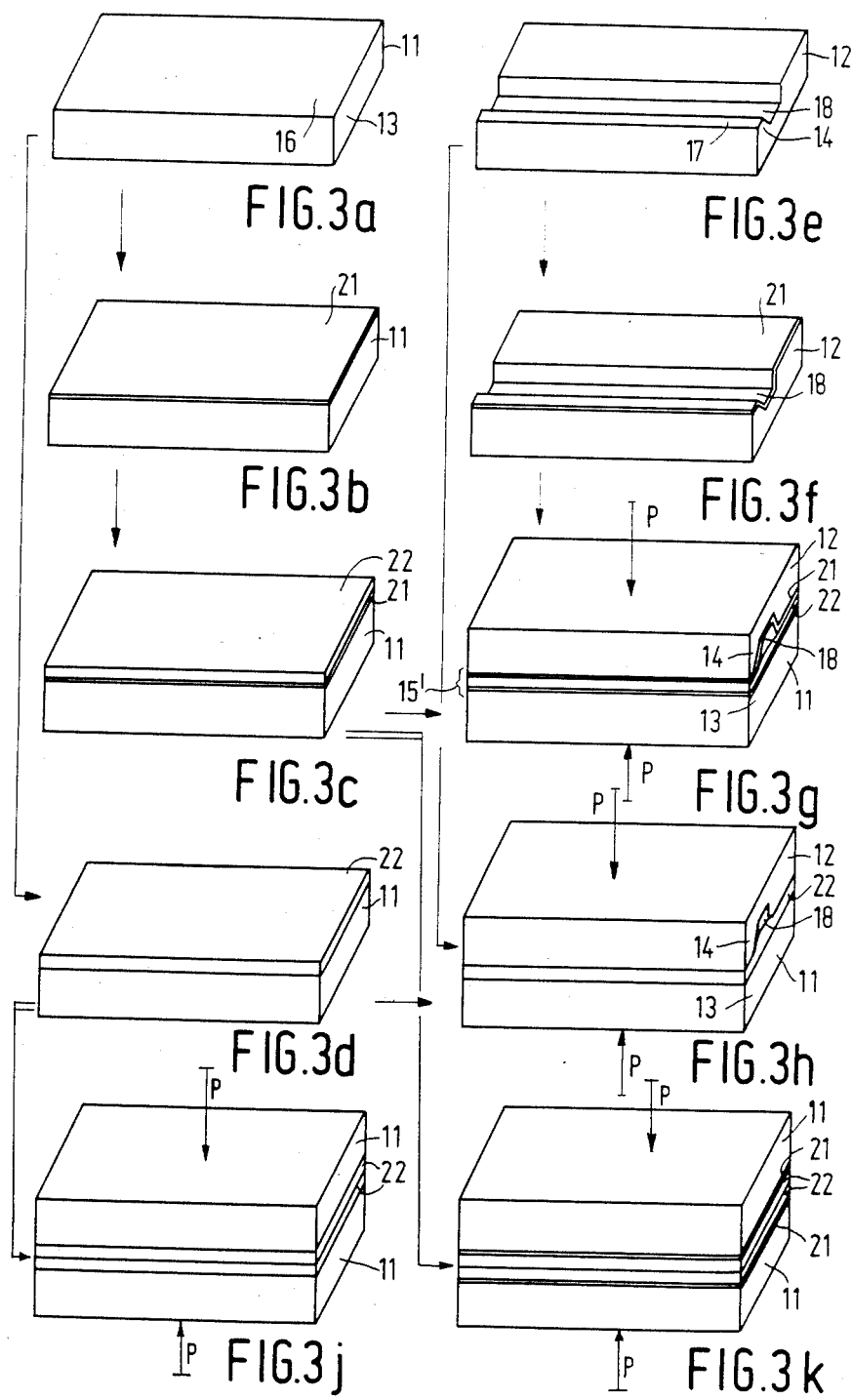

MAGNETIC HEAD WITH A MODIFIED GAP FILLER

BACKGROUND OF THE INVENTION

The invention relates to a magnetic head comprising a magnetic core provided with pole tips which limit a gap having a small length and filled with non-magnetizable material which adheres these pole tips to each other, and further to a method of manufacturing such a magnetic head.

Such a magnetic head is known from U.S. Pat. No. 3,656,229 and can be used for recording, reproducing and/or erasing magnetic information in a track of a magnetic information carrier.

The gap in the magnetic core is of essential importance for the quality of a magnetic head: the length of the gap should be small to very small dependent upon the envisaged application of the magnetic head, while also the permissible tolerance of the gap length is very small. In magnetic heads for video-recording, in which information carriers of the longitudinal magnetization type are used, a gap length of approximately 0.25 $\mu$m is aimed at; in the case of an information carrier of the perpendicular magnetization type, a gap length of approximately 0.1 $\mu$m is aimed at. Furthermore, the material with which the gap is filled and the adhesion of this material to the gap-limiting surfaces of the pole tips are important for the durability of the magnetic head.

The term "gap length" is to be understood to mean herein the dimension of the gap which corresponds to the distance between the gap limiting surfaces of the pole tips.

According to U.S. Pat. No. 3,656,229, magnetic heads are obtained by providing on a magnetic core part a layer of a non-magnetic metal oxide or metal oxide mixture as a material filling the gap and determining the length of the gap. The core part is heated for this purpose to a comparatively high temperature (400°–800° C.) in contact with the vapour of one or more organometallic compounds. A second core part, which may be provided with such a metal oxide layer, is adhered to the first part by means of an adhesive. Examples of adhesives are glass and synthetic resins, but the patent gives preference to glass because synthetic resins would swell to an undesired extent. In order to unite the core parts, they are arranged opposite each other and molten glass is caused to flow into the slit between these core parts. The magnetic heads obtained have a gap length of 0.8–1.2 $\mu$m.

For many applications, this gap length is too large. Other disadvantages of these known magnetic heads are that the metal oxide layer is deposited from the gaseous phase at a high temperature. In the manufacture of magnetic heads, this step is time-consuming and expensive, while the step of filling the slit between two core parts with molten glass is difficult to control. It is moreover desirable to provide both core parts with a metal oxide layer in order to prevent interaction between the glass and a core part not coated with metal oxide. In this magnetic head, the gap consequently has a filling composed of two or three layers. The accuracy with which the gap length is adjusted therefore depends in this known magnetic head upon the accuracy with which the desired thickness of each of the two or, in the preferred case, three layers is obtained.

SUMMARY OF THE INVENTION

One object of the invention is to provide a magnetic head of which the gap length is very small, which magnetic head can be readily manufactured and has a great mechanical strength.

According to the invention the material filling the gap and adhering the pole tips to each other is a synthetic resin chosen from the group consisting of epoxy resins, acrylic ester resins and polyester resins and the gap length is at most 0.5 $\mu$m.

Experiments have shown that the magnetic head according to the invention has a high durability; it is resistant to changing climatic conditions, has a great mechanical strength (large to very large forces are required to eliminate the adherence between the pole tips) and has a high resistance to wear. Thus, it has been found that, after the pole face of the magnetic head had been treated with an abrasive belt, the pole tips at the pole face and the material in the gap were uniformly worn off. No material had been broken from the gap-limiting surfaces of the pole tips, which usually consist of Mn-Zn-ferrite.

In achieving the invention, the prejudice manifest in the aforementioned patent, that synthetic resins would be less suitable for use in magnetic heads because they swell to an undesired extent, was overcome. Further, according to the patent, synthetic resins are used exclusively as an adhesive. Synthetic resins would have to be even more unsuitable to be used not only as an adhesive, but additionally as the gap filling material—that is to say as a material determining the gap length—in magnetic heads.

This prejudice had become manifest already much earlier in German Patent Specification No. 1,171,467. There it is said that with the use of ethoxyline resins and polyester resins as a gap-filling material, mechanical means have to be employed to keep the magnet core parts pressed together. It is further noted that the synthetic resin is ground away rapidly, as a result of which the gap edges are not kept supported and consequently start to crumble off. Finally, it is noted that gaps of a small length (a few $\mu$m) can be realized only with difficulty and that the gap length cannot be readily adjusted with great accuracy.

It is not surprising that synthetic resins have not been used as a gap-filling material for obtaining gaps having a progressively smaller length (down to below 0.5 $\mu$m), since when using synthetic resins as the gap-filling material, gaps having a length of a few $\mu$m were described to be achievable only with great difficulty and with little accuracy. On the contrary, use has increasingly been made of thin foils as a spacer which were secured with the aid of vitreous material. As the required gap length became smaller and the spacer foils became so thin that they could no longer be manipulated, the choice was increasingly made to apply the gap-filling material by evaporation or by sputtering. Gaps are then mostly obtained which are filled with material composed of several layers. Due to their time-consuming manufacture, such magnetic heads are expensive.

In view of the negative judgement made on synthetic resins as a material to fill the gap and to adhere the pole tips firmly together and also in view of the complicated gap fillings and the complicated manufacturing techniques used recently, it is very remarkable that it has proved possible with the aforesaid synthetic resins to obtain a magnetic head of high quality which can be manufactured in a very simple manner. In contrast with the gap filling of the conventional magnetic heads, the gap filling of the magnetic head according to the invention comprises a simple or substantially simple layer. Besides properties such as resistance to climatic influences, mechanical strength and resistance to the action of grinding tape, the magnetic core can be subjected to the operation of a laser, for example in order to form a space for the magnetic coil or in order to reduce the width of the gap at the running surface without the gap, its filling and the adhesion of the filling to the pole tips being noticeably adversely affected. Very favourable results were obtained with the use of an acrylic ester resin as a gap-filling material adhering the pole tips together.

In a favourable embodiment, a modifier is used at the interfaces between pole tip and synthetic resin to further increase the tensile strength. The term "modifier" is to be understood herein to means a bifunctional compound which can be chemically bended on the one hand to the material of the pole tip and on the other hand to the synthetic resin. As soon as the modifier has reacted with the synthetic resin, the reaction product can be considered as a synthetic resin with substituents which have been chemically bonded or can be chemically bonded to the pole tip material. As a modifier with an epoxy resin, a trialkoxy-alkylsilane may be used in which the alkyl group has a substituent reactive with the epoxy resin, such as an amino or an epoxy group. The alkoxy groups can form oxygen bridges with the magnetic material. By using 3-glycidoxypropyl trimethoxy silane

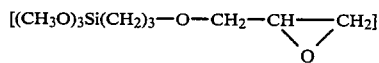

as the modifier, the tensile strength of an otherwise unchanged magnetic head with a gap filling of epoxy resin was increased from 136 to more than 256 kg/cm$^2$. With the same modifier, when using a polyester resin, a tensile strength of 240 kg/cm$^2$ was measured.

Acrylic ester resin can be modified with, for example, methacryloxypropyltrimethoxysilane. In view of the function of the modifier, which is to ensure that a chemical bond is obtained between the pole tips and the synthetic resin, a mono-molecular skin of the modifier at the interfaces between a pole tip and the synthetic resin is sufficient. The presence of the modifier need not be limited to the interface; the modifier may also be distributed in the synthetic resin.

Other gaps of the magnetic head, such as a rear gap, may be filled with a similar modified or unmodified synthetic resin.

The invention also relates to a method of manufacturing a magnetic head comprising a magnet core provided with pole tips limiting a gap of small length, in which a first moulding of magnetizable material has a first gap-limiting pole tip surface provided with a layer of non-magnetizable material. A second moulding of magnetizable material has a second gap-limiting pole tip surface arranged opposed to the first gap-limiting pole tip surface. The two moldings are adhered together at an elevated temperature, the layer of non-magnetizable material being interposed between them.

Such a method is known from U.S. Pat. No. 3,656,229. This method had the disadvantage that the layer of non-magnetizable material has to be applied at high temperatures, preferably to both mouldings and that the two mouldings, after having been coated, are adhered together with an adhesive in a manner difficult to control.

Another object of the invention is to provide a method of manufacturing a magnetic head which can be readily carried out and by which a magnetic head having a gap of small length and great strength is obtained.

Said object is achieved in a method of manufacturing a magnetic head comprising a magnet core provided with pole tips limiting a gap of small length. A first moulding of magnetizable material has a first gap-limiting pole tip surface provided with a layer of non-magnetizable material, and a second moulding of magnetizable material having a second gap-limiting pole tip surface arranged opposed to the first gap-limiting pole tip surface. The two mouldings are adhered together at an elevated temperature, the layer of non-magnetizable material being interposed between them. A solution of a synthetic resin chosen from the group consisting of epoxy resins, acrylic ester resins and polyester resins is applied to the first gap-limiting pole tip surface and the first moulding is spun about an axis at right angles to this first gap-limiting pole tip surface, the solvent evaporating. The synthetic resin is then cured, while the second moulding is pressed against the layer of synthetic resin, so that its second gap-limiting pole tip surface is located at a distance of at most 0.5 μm from the first gap-limiting pole tip surface.

In a modification of this method, a solution of the synthetic resin is also applied to the gap-limiting surface of the pole surface of the second moulding and this moulding is spun about an axis at right angles to this pole piece surface. By spinning the mouldings the solution is spread over the pole surface.

The method according to the invention has the great advantages of accuracy, simplicity and rapidity. The method is excellently reproducible when the same concentration of the resin in the solvent, the same speed of revolution of the moulding to be coated and the same pressure during curing are maintained. The steps of applying the resin and of curing it are effected rapidly, while a temperature of up to aproximately 250° C. is sufficient for curing. Due to this low temperature, no or substantially no stresses are produced in the magnetic material during the manufacture of the magnetic head. Due to the simplicity of the method and due to the fact that the process conditions can be readily maintained, the modification of the method, in which both gap-limiting pole tip surfaces are coated with synthetic resin, is not disadvantageous and magnetic heads can be manufactured in a reproducible manner.

As could be expected, differences in layer thickness in the coating of synthetic resin, such as an embossed part along the edge of the first gap-limiting pole tip surface, can occur. However, such differences do not influence the quality of the magnetic head. When the second moulding is urged towards the first moulding, a plastic deformation of the layer of synthetic resin occurs, as a result of which differences in layer thickness are eliminated and the desired length of the gap to be formed is adjusted.

As compared to many other methods of manufacturing magnetic heads, the method according to the invention has the advantage that only one gap-filling material need be applied. In case it is desirable to increase the adhesion of the synthetic resin to the gap-limiting surfaces, a modifier may be added to the solution of synthetic resin.

However, it is also possible in a simple manner to apply a film of modifier to the gap-limiting pole tip surfaces. For this purpose, the mouldings may be immersed with these surfaces in a solution of the modifier. However, according to a very favourable and simple embodiment, these surfaces may be exposed to the vapour of the modifier, for example in an evacuated container. In view of the function of the modifier, a monomolecular skin is sufficient.

If a modifier skin is used, this does not imply a complication for obtaining the desired gap length. On the one hand, the skin is allowed to be a monomolecular layer so that this skin is extremely thin, while on the other hand the gap length is determined by the thickness of the layer of synthetic resin and the pressure exerted during the curing step.

The product of the method may be machined, if desired, for example, to obtain therefrom a number of magnetic heads by sawing. It is also possible to reduce the width of the gap (the dimension of the gap along the pole face of the magnetic head and parallel to the gap-limiting pole tip surfaces) by removing pole tip material and hence synthetic resin adhered thereto. Further, a coil chamber (a space to be traversed by wire turns) may be formed or enlarged, for example, by means of a laser. The synthetic resin present in the gap in fact does not interfere with these machining operations.

BRIEF DESCRIPTION OF THE DRAWING

FIGS. 3a–3k are perspectives diagramming the steps of the method.

DETAILED DESCRIPTION OF THE PREFERRED EMBODIMENT

Figure 1:
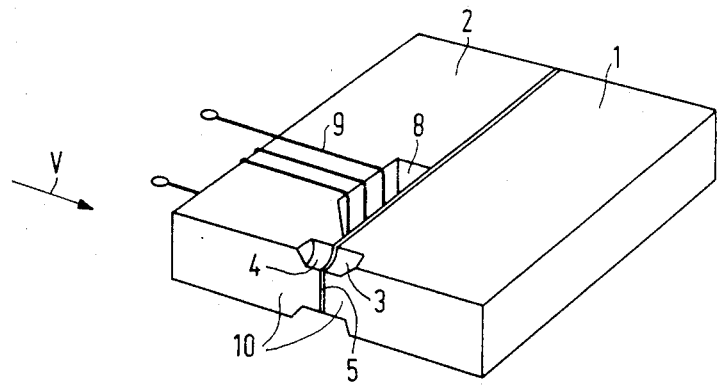
FIG. 1 is a diagrammatic perspective of a magnetic head.

The magnetic head shown in FIG. 1 has a magnetic core comprising two parts 1, 2 each provided with a pole tip 3 and 4, respectively. The pole tips 3, 4 limit a gap 5 having a gap length of at most 0.5 $\mu$m. The relative direction of movement of a magnetic information carrier, which co-operates with the magnetic head, is indicated by the arrow V. The term "gap length" is to be understood to mean the dimension of the gap 5 in the direction of the arrow V.

The gap 5 is filled with synthetic resin as a non-magnetizable material. The synthetic resin adheres the pole tips 3, 4 to each other. The opposed surfaces of the pole tips 3, 4 to which the synthetic resin adheres are designated in this specification "gap-limiting surfaces".

In the magnetic core part 1 is recessed a coil chamber 8 which is traversed by wire turns 9. A pole face 10 is the surface of the magnetic head along which the information carrier is passed during recording, reproducing or erasing of magnetic information.

Figure 2:
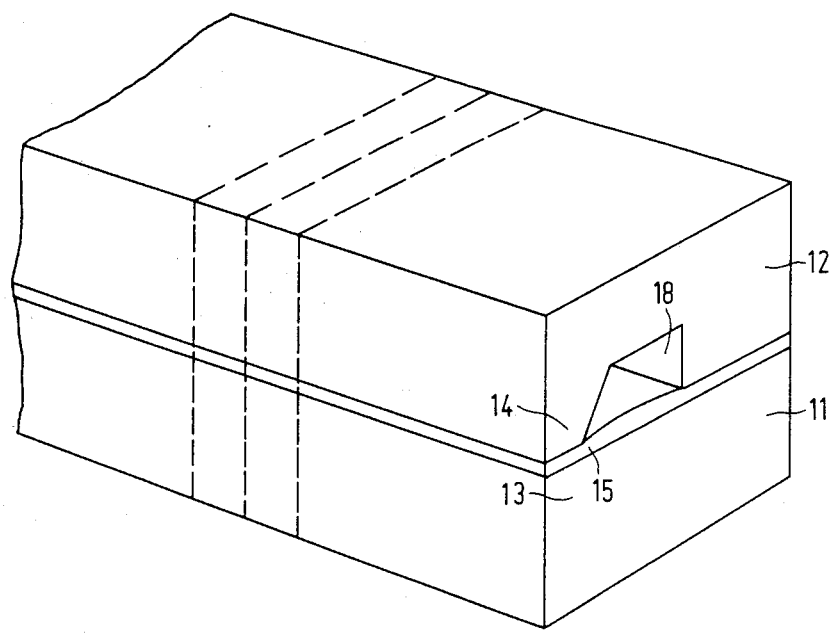
FIG. 2 is a diagrammatic perspective of an assembly of two mouldings of magnetizable material adhered together by a layer of synthetic resin.

In the assembly shown in FIG. 2, corresponding parts are each designated by a reference numeral which is 10 higher than the numerals used in FIG. 1. Dotted lines indicate that magnetic heads can be obtained from this assembly, for example, by sawing.

FIG. 3a shows a first moulding 11 of magnetizable material corresponding to that shown in FIG. 2. The moulding has a part 13 from which a pole tip is formed later. Reference numeral 16 denotes a first gap-limiting pole tip surface.

The moulding of FIG. 3b is formed from the moulding of FIG. 3a by applying a modifier skin 21 to the first gap-limiting pole tip surface 16 (FIG. 3a). (In order to visualize this skin, it is shown here and elsewhere, as layers of synthetic resin are, in a disproportionately large thickness). The skin 21 is obtained by contacting the surface 16 with the vapour of the modifier.

FIG. 3e shows a second moulding 12 of magnetizable material as shown in FIG. 2. A second pole tip is formed from the part denoted by 14, while reference numeral 17 designates the second gap-limiting pole tip surface (the gap-limiting surface of this second pole tip).

As in FIG. 3b, reference numeral 21 denotes in FIG. 3f a modifier skin.

In FIG. 3c, a layer 22 of synthetic resin as a non-magnetizable material is applied to the moulding of FIG. 3b by applying a solution of a synthetic resin to the first gap-limiting pole tip surface 16 provided with a modifier skin 21 and by rotating the moulding about an axis at right angles to this surface 16, during which process the solvent is thrust away and evaporates.

The product shown in FIG. 3c and that shown in FIG. 3f are united in FIG. 3g with the first gap-limiting pole tip surface 16 and the second gap-limiting pole tip surface 17 facing each other and with the synthetic resin layer 22 interposed between the surfaces 16 and 17. While the second moulding 12 is pressed against the layer 22 of synthetic resin so that the second gap-limiting pole piece surface 17 is located at a distance of at most 0.5 $\mu$m from the first gap-limiting pole piece surface 16, the synthetic resin is cured and adheres to the said gap-limiting surfaces 16 and 17, thus forming the gap 15'.

In FIG. 3d, the first moulding 11 is provided with a layer 22 of a synthetic resin applied in the manner described with reference to FIG. 3c. The layer does not contain a modifier. In a similar manner, however, a moulding 11 is provided with a modifier dispersed in the layer 22 of synthetic resin obtained by dissolving a modifier in the solution of synthetic resin.

The moulding of FIG. 3d is united with the moulding of FIG. 3e (see FIG. 3h) in a manner described with reference to FIG. 3g. At an elevated temperature and under pressure (P), the layer 22 of synthetic resin was cured with a maximum layer thickness of 0.5 $\mu$m, thus forming the gap 15.

FIG. 3j shows a modification of the method, obtained by combining two products according to FIG. 3d. Similarly in FIG. 3k two products according to FIG. 3c are combined. In the products of FIG. 3j and FIG. 3k, respectively, for example by means of a laser a coil chamber may be provided.

EXAMPLES (1) Mouldings of ferrite as magnetizable material are cleaned by means of a plasma discharge in oxygen or with ozone, for example generated in situ in air by means of an ultraviolet radiation source. The mouldings were contacted at 0.01 bar with the vapour of 3-glycidoxypropyltrimethoxysilane as modifier.

A 3% by weight solution of the diglycidyl ether of disphenol A in methyl ethyl ketone and, as a curing agent, dicyanodiamide was applied to a first moulding. The moulding, whose coated surface had dimensions of 0.8 × 1.6 cm, was spun at 1500 revolutions/min. The second moulding was positioned with respect to the first moulding and urged with 27 bar. The epoxy resin was cured under pressure at 200° C. The length of the gap obtained was 0.2 μm.

A 15% by weight solution of the same material in monoethylglycol was applied to a similar moulding. The moulding was spun at 3500 revolutions/min. After positioning a second moulding, a gap of 0.1 μm was obtained under the same conditions.

(2) In a comparison test, mouldings of ferrite (0.3×0.8×1.6 cm) were pairwise coated with synthetic resin. The coated surfaces (0.8×1.6 cm) of each pair of mouldings were urged against each other under pressure. The synthetic resin was cured. At the long side faces a groove was provided on the seam of synthetic material, in which groove the claws of an apparatus for measuring the tearing resistance can be positioned. The tearing resistance of the seam was determined according to the method of S. M. Wiederhorn and L. H. Bolz, J. Am. Ceram. Soc., 53 (1970) 543.

(a) Ferrite mouldings were coated pairwise with a solution of 50 parts by weight of the acrylic acid ester of the bis-hydroxyethyl ether of bisphenol A in 1,1,1,-trichloroethane, to which were added 1 part by weight of methacryloxypropyltrimethoxysilane as modifier and 0.5 part by weight of dimethoxyphenylbenzoylmethane as initiator. The mouldings were spun at 3500 revolutions/min. The coated surfaces were urged against each other with a pressure of 10 bar and the synthetic material was cured by heating at 150° C. for 30 minutes. The seam of synthetic material (corresponding to the gap of a magnetic head) had a width (length) of 0.15 μm.

(b) Similarly, ferrite mouldings were coated with a solution of 6 parts by weight of unsaturated polyester, 2 parts by weight of peroxide and as modifier 1 part by weight of 3-glycidoxypropyltrimethoxysilane in 100 parts by weight of 1,1,1,-trichloroethane. The mouldings were spun at 4500 revolutions/min. The coated surfaces were urged against each other with a pressure of 15 bar and the synthetic material was cured by heating for 2 hours at 100° C. The thickness of the polyester layer between the moulding was 0.2 μm.

(c) Similar mouldings were coated with a solution of 1 part by weight of 3-glycidoxypropyl-trimethoxysilane and 15 parts by weight of bisphenol A-diglycidyl ether containing as curing agent dicyanodiamide in 100 parts by weight of ethylglycolacetate. The mouldings were spun at 3500 revolutions/min and urged against each other with their coated surfaces under a pressure of 40 bar. The synthetic material was cured by heating for 30 minutes at 200° C. The thickness of the epoxy layer was 0.2 μm.

The products obtained were tested with respect to their tearing resistance partly immediately and partly after having been subjected to a cyclic moisture test. In this test, the products are kept for 1.5 hours at 25° C., are heated in 2 hours to 65° C., are kept for 2 hours at 65° C. and are cooled in 2 hours to 25° C. The relative humidity is kept at 93% during this cycle. The test is continued for 10 days according to this schedule. For many applications of magnetic heads, this test is more severe than practical conditions.

The results of the measurements are indicated in the following table.

TABLE

| example | tearing resistance ($MPa.m^{\frac{1}{2}}$) | |
|---|---|---|
| | before moisture test | after moisture test |
| 2a | 0.9–1.1 | 0.9–1.1 |
| 2b | 0.67 | 0.4 |
| 2c | 0.9 | 0.3 |
| solid ferrite | 0.8–1.0 | 0.8–1.0 |

For comparison, in the table the tearing strength of a solid ferrite moulding is indicated.

It appears from the table that the products which are obtained with the use of acrylic ester resin are not adversely affected by the moisture test and have at the seam at least the same tearing resistance as ferrite itself.

It further appears that with epoxy resin and with polyester resin very short gaps with a high resistance to tearing can be obtained. As a standard for practical usability a tearing strength of 0.6 $MPa.m^{\frac{1}{2}}$ is employed.

It also appears that the conditions of the moisture test have been too heavy in view of the standard for the products of, for example, (2b) and (2) and that magnetic heads obtained in the manner described for these examples must not be subjected to these extreme conditions. It is finally apparent from Example (2b) that the polyester resin has a higher resistance to these extreme conditions than the epoxy resin.

What is claimed is:

1. A magnetic head comprising first and second ferrite moldings having respective gap limiting pole tip surfaces, said surfaces being opposed to limit a gap of less than 0.5 microns therebetween, a modifier being applied to at least one of said gap limiting pole tip surfaces, said gap being filled with a synthetic resin selected from the group consisting of epoxy resins, acrylic ester resins, and polyester resins, said modifier being chemically bonded to the pole tip and the synthetic resin, said synthetic resin adhering to said pole tips.

2. A magnetic head as claimed in claim 1, characterized in that the modifier is also dispersed in the synthetic resin.

3. A magnetic head as claimed in claim 1 or 2, characterized in that the synthetic resin is an acrylic ester resin.

* * * * *